(12) United States Patent
LaGasse (10) Patent No.: US 6,570,688 B2
(45) Date of Patent: May 27, 2003

(54) METHOD AND APPARATUS FOR CUTTING WAVEGUIDES TO PRECISE DIFFERENTIAL LENGTHS USING TIME-DOMAIN-REFLECTOMETRY

(75) Inventor: Michael J. LaGasse, Lexington, MA (US)

(73) Assignee: AXE, Inc., Maynard, MA (US)

( * ) Notice: Subject to any disclaimer, the term of this patent is extended or adjusted under 35 U.S.C. 154(b) by 0 days.

(21) Appl. No.: 10/224,246

(22) Filed: Aug. 19, 2002

(65) Prior Publication Data

US 2003/0012514 A1 Jan. 16, 2003

Related U.S. Application Data

(62) Division of application No. 09/606,706, filed on Jun. 29, 2000, now Pat. No. 6,456,685.

(51) Int. Cl.$^7$ ................................................. H04J 14/08
(52) U.S. Cl. ........................ 359/140; 359/138; 359/618
(58) Field of Search .................. 65/378, 433; 356/73.1; 385/1, 2, 3, 12, 134, 147; 250/227.11, 227.12, 227.15, 227.16; 225/1, 2, 4, 5; 359/123, 135, 138, 139, 140, 618

(56) References Cited

U.S. PATENT DOCUMENTS

| | | | | |
|---|---|---|---|---|
| 3,849,604 A | * | 11/1974 | Benes et al. ................. | 359/140 |
| 5,625,479 A | * | 4/1997 | Suzuki et al. ................ | 359/135 |
| 6,014,237 A | * | 1/2000 | Abeles et al. ................ | 359/124 |
| 6,141,127 A | * | 10/2000 | Boivin et al. ................ | 359/124 |
| 6,204,956 B1 | * | 3/2001 | Cisternino et al. .......... | 359/328 |
| 6,351,587 B1 | * | 2/2002 | Holland ........................ | 385/48 |
| 6,411,415 B1 | * | 6/2002 | Smets et al. ................. | 359/158 |

OTHER PUBLICATIONS

Hewlett Packard Product Note 8504–1, "Measurements of Lightwave Component Reflections with the HP 8504B Precision Reflectometer" (1992).
U.S. patent application Ser. No. 09/566,303, Hall et al., May 8, 2000.
U.S. patent application Ser. No. 09/737,668, LaGasse et al., Dec. 14, 2000.
U.S. patent application Ser. No. 10/014,393, Rao et al., Dec. 11, 2001.
U.S. patent application Ser. No. 10/063,571, Rao, May 2, 2002.

\* cited by examiner

*Primary Examiner*—Thong Nguyen
*Assistant Examiner*—Arnel C. Lavarias
(74) *Attorney, Agent, or Firm*—Kurt Rauschenbach; Rauschenbach Patent Law Group, LLC (57) ABSTRACT

An apparatus and method for cleaving optical waveguides to precise differential length are described. A first end of a waveguide is coupled to an input port of a reflectometer. A reference mirror is then positioned in a path of radiation propagating through the second end of the waveguide. A waveguide cutting tool is then positioned proximate to the waveguide and at a distance relative to a reference mirror. A first reflectometry measurement is performed on the waveguide to a second end of the waveguide. A second reflectometry measurement is performed on the waveguide to the reference mirror. The waveguide is then positioned relative to the reference mirror and waveguide cutting tool so that the first reflectometery measurement is a measurement increment apart from the second reflectometry measurement. The waveguide is then cut with the cutting tool positioned at the distance relative to the reference mirror. The method is repeated for a new waveguide with the measurement increment being the same measurement increment displaced by a different measurement increment that corresponds to a desired differential length between the waveguide and the new waveguide.

21 Claims, 5 Drawing Sheets

METHOD AND APPARATUS FOR CUTTING WAVEGUIDES TO PRECISE DIFFERENTIAL LENGTHS USING TIME-DOMAIN-REFLECTOMETRY

RELATED APPLICATIONS

This is a divisional of U.S. patent application Ser. No. 09/606,706 filed on Jun. 29, 2000, now U.S. Pat. No. 6,456,685, the entire disclosure of which is hereby incorporated herein by reference.

FIELD OF THE INVENTION

The present invention generally relates to methods and apparatus for cutting, cleaving, or forming waveguides to precise differential lengths. In particular, the present invention relates to methods and apparatus for cleaving two or more optical waveguides to precise differential lengths.

BACKGROUND OF THE INVENTION

There are numerous applications in fields such as communications, testing, and measurement that require two or more waveguides having precise differential lengths. In particular, there are many applications in these fields that require two or more optical fibers having precise differential lengths.

Prior art methods of cleaving optical fibers to precise differential lengths have limited accuracy and have numerous other disadvantages. For example, one prior art method involves repeatedly polishing the end face of the optical fiber and then measuring its optical path length. In this method, the optical fiber is cut to an approximate length that is greater than the desired length and the optical path length of the fiber is measured. The end face of the optical fiber is then polished to reduce the length of the optical fiber and the new optical path length of the fiber is measured. This process of polishing and measuring is repeated until of the desired fiber length is achieved. This prior art method is very time and labor intensive and, therefore, is not suitable for manufacturing components in large volume. In addition, the polishing may damage the optical fiber making it unsuitable for some applications.

Another prior art method of cleaving optical fibers to precise differential lengths uses thermal fiber stretching techniques to change the length of the fiber to the desired length. This prior art method uses a fusion splicer or optical fiber furnace to heat and stretch the optical fiber to the desired length. This prior art method also has numerous disadvantages. The equipment for thermally stretching and cutting optical fibers to precise lengths is expensive, physically large and complex.

In addition, optical fibers can only be stretched in a limited range and stretching an optical fiber may weaken the fiber and, therefore, make it susceptible to failing. Therefore, thermal fiber stretching methods may not be suitable for optical fiber systems that require high reliability. Also, stretching an optical fiber may change the polarization and dispersion properties of the optical fiber. Therefore, thermal fiber stretching techniques may not be suitable for some applications and for some special types of optical fiber, such as polarization maintaining and dispersion compensating optical fiber.

SUMMARY OF THE INVENTION

The present invention relates to cutting, cleaving or forming waveguides to precise differential lengths. By differential length we mean the difference in length from one waveguide to another waveguide. The methods and apparatus of the present invention apply to any type of waveguide including high frequency and optical waveguides.

It is an object of the present invention to provide a method for cleaving two or more optical fibers to an accuracy on the order of 100 microns or less. It is another object of the present invention to improve the manufacturability of components for high-speed optical time-domain multiplexing (OTDM) communication systems, such as OTDM multiplexers and demultiplexers. It is another object of the present invention to improve the manufacturability of components for differential detection systems including coherent detection systems.

A discovery of the present invention is that two or more optical waveguides can be cut to a differential accuracy of less than 20 microns by aligning a cleaving tool at a position that is determined with reference to two optical time-domain reflectometry (OTDR) measurements. In one embodiment of the invention, one OTDR measurement is taken to an end of the waveguide and the other OTDR measurement is taken to a reference mirror positioned in the path of radiation propagating from the end of the waveguide.

Accordingly, the present invention features a method of cutting waveguides to precise differential lengths. The method includes coupling a first end of a waveguide to an input port of a reflectometer. A reference mirror is then positioned in a path of radiation propagating through the second end of the waveguide. A waveguide cutting tool is then positioned proximate to the waveguide and at a distance relative to a reference mirror.

A first reflectometry measurement is performed on the waveguide to a second end of the waveguide. A second reflectometry measurement is performed on the waveguide to the reference mirror. The first and/or second reflectometry measurements may be OTDR measurements. The waveguide is then positioned relative to the reference mirror and waveguide cutting tool so that the first reflectometery measurement is a measurement increment apart from the second reflectometry measurement. The measurement increment may be a time or a distance measurement increment. The waveguide is then cut with the cutting tool positioned at the distance relative to the reference mirror.

The above method is repeated for a new waveguide with the measurement increment being the same measurement increment displaced by a second measurement increment that corresponds to a desired differential length between the waveguide and the new waveguide. The same measurement increment may be displaced by the second measurement increment by adding the measurement increment to the second measurement increment or by subtracting the measurement increment from the second measurement increment.

The present invention also features a method of cutting two optical fibers to a precise differential length. The method includes coupling a first end of a first optical fiber to an input port of a reflectometer. A reference mirror is then positioned in a path of radiation propagating through the second end of the first optical fiber. A fiber cleaving tool is then positioned proximate to the first optical fiber and at a distance relative to a reference mirror.

A first reflectometry measurement is performed on the first optical fiber to a second end of the first optical fiber. A second reflectometry measurement is performed on the first optical fiber to the reference mirror. The first and/or second reflectometry measurements may be OTDR measurements.

The first optical fiber is then positioned relative to the reference mirror and fiber cleaving tool so that the first reflectometery measurement is a measurement increment apart from the second reflectometry measurement. The measurement increment may be a time or a distance measurement increment. The first optical fiber is then cut with the cutting tool positioned at the distance relative to the reference mirror.

The above method is repeated for the second optical fiber with the measurement increment being the same measurement increment displaced by a second measurement increment that corresponds to a desired differential length between the first optical fiber and the second optical fiber. The same measurement increment may be displaced by the second measurement increment by adding the measurement increment to the second measurement increment or by subtracting the measurement increment from the second measurement increment.

The present invention also features a method of manufacturing a bit interleaved optical multiplexer having N channels. The method includes cleaving N output optical fibers of a 1×N optical splitter to desired differential lengths. Each of the N output optical fibers is cleaved by aligning an optical fiber cleaving tool at a position along the output optical fiber that is determined with reference to two OTDR measurements of the output optical fiber. In one embodiment, the two OTDR measurements of the output optical fiber comprise a first OTDR measurement to an end of the output optical fiber and a second OTDR measurement to a reference mirror.

N fiber pigtail modulator sections are then cleaved to desired differential lengths. Each of the N fiber pigtail modulator sections is cleaved by aligning an optical fiber cleaving tool at a position along the pigtail modulator section that is determined with reference to two OTDR measurement of the pigtail modulator section. In one embodiment, the two OTDR measurements of the input optical fiber comprise a first OTDR measurement to an end of the input optical fiber and a second OTDR measurement to a reference mirror.

N input optical fibers of a 1×N optical combiner are then cleaved to desired differential lengths. Each of the N input optical fibers are cleaved by aligning an optical fiber cleaving tool at a position along the input optical fiber that is determined with reference to two OTDR measurement of the input optical fiber. In one embodiment, the two OTDR measurements of the pigtail modulator section comprise a first OTDR measurement to an end of the pigtail modulator section and a second OTDR measurement to a reference mirror.

A respective one of the N channels of each of the bit interleaved optical multiplexer has a desired optical path length that includes a combination of a respective one of the optical path lengths of the N output optical fibers, a respective one of the N fiber pigtail modulator sections, and a respective one of the N input optical fibers. In one embodiment, at least two of the desired differential lengths of the N output optical fibers of a 1×N optical splitter are substantially zero. In one embodiment, at least two of the desired differential lengths of the N input optical fibers of a 1×N optical combiner are substantially zero.

The present invention also features an optical fiber cleaving apparatus for cleaving optical fibers to precise differential lengths. The optical fiber cleaving apparatus includes a reflectometer that has an input port that accepts a first end of an optical fiber to be cleaved. In one embodiment, the reflectometer is an OTDR reflectometer. A reference mirror is positioned in the path of an optical beam propagating from a second end of the optical fiber. In one embodiment, the reference mirror is moveable and may be mounted on a precision translation stage. In one embodiment, the optical fiber is mounted on a precision translation stage and the position of the optical fiber relative to at least one of the fiber cleaving tool and the reference mirror is determined by the precision translation stage.

A fiber cleaving tool is positioned at a distance relative to the reference mirror. The fiber cleaving tool cleaves the optical fiber at a desired position that is determined with reference to a first reflectometry measurement to the end of the optical fiber and a second reflectometry measurement to the reference mirror.

BRIEF DESCRIPTION OF THE DRAWINGS

This invention is described with particularity in the appended claims. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Optical Time-Domain Reflectometry (OTDR) is a commonly used reflectometry technique that can identify and quantify individual reflections within optical components, assemblies, and systems. Individual reflections are measured and displayed as a function of distance or position. One application of OTDR is installation and maintenance of long-haul and short-haul fiber links. OTDR can be used to locate faults in a fiber link by probing the fiber link with an optical pulse train and then measuring the reflected and backscattered light from the faults.

Figure 1:
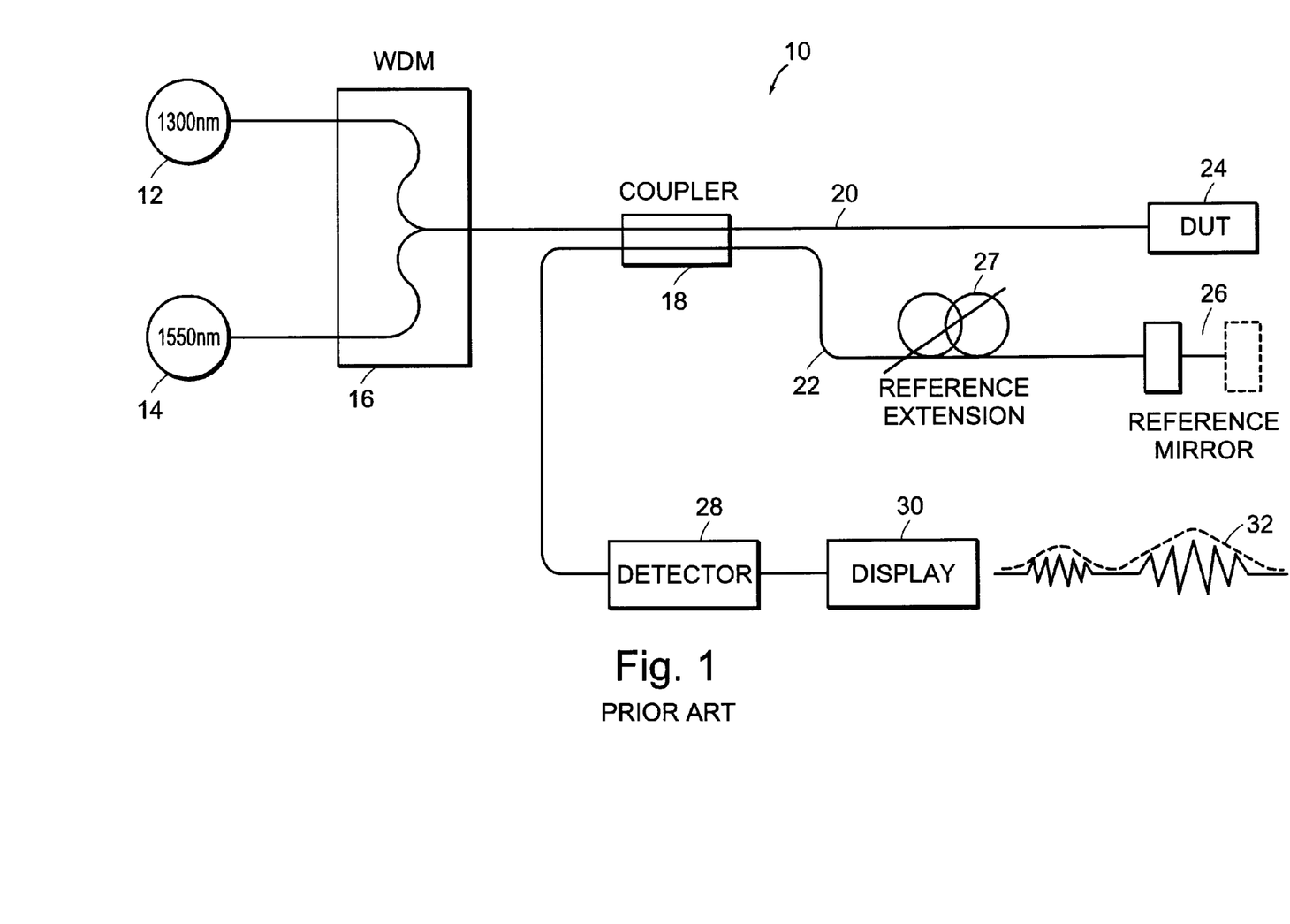
FIG. 1 illustrates a block diagram of a prior art precision optical reflectometer.

FIG. 1 illustrates a block diagram of a prior art precision optical time domain reflectometer (OTDR) 10 that uses Michenson interferometer and white light interferometry. Such instruments are well known in the art and are commercially available. One such instrument is the Agilent HP 8504B Precision Reflectometer.

The reflectometer 10 includes at least one optical source. In the reflectometer of FIG. 1, two optical sources are used. A first optical source 12 having a first wavelength and a second optical source 14 having a second wavelength are optically coupled into a wavelength division multiplexer (WDM) 16. For example, the Agilent HP 8504B Precision Reflectometer uses 1300 nm and 1550 nm low coherence light sources.

The resulting signal is propagated to an optical coupler 18 that splits the signal into a first optical waveguide 20 and a second optical waveguide 22. The first optical waveguide 20 is coupled to a device under test (DUT) 24. The second optical waveguide 22 is coupled to a reference mirror 26 having a reference extension arm 27. Light is reflected from both the device under test 24 and the reference mirror 26. The coupler 18 then recombines the reflected light. A detector 28 is optically coupled to an output of the coupler and detects the reflected light. A display 30 then displays signals 32 indicative of the combined reflected light.

If the optical path lengths from the optical sources 12, 14 to the device under test 24 are the same as the optical path lengths from the sources 12, 14 to the reference mirror 26, then a coherent interference signal is detected at the detector 28 and displayed on the display 32. The device under test 24 can be scanned for coherent interference signals by moving the reference arm extension 27 and, therefore, the reference mirror 26 over the distance range of the reference arm extension or by changing the length of a reference optical fiber. Commercially available precision reflectometers, such as the Agilent HP 8504B, can measure and display two reflections that are closer than 25 microns (equivalent air distance). Also, these instruments can achieve return loss measurements beyond 80 dB.

Figure 2:
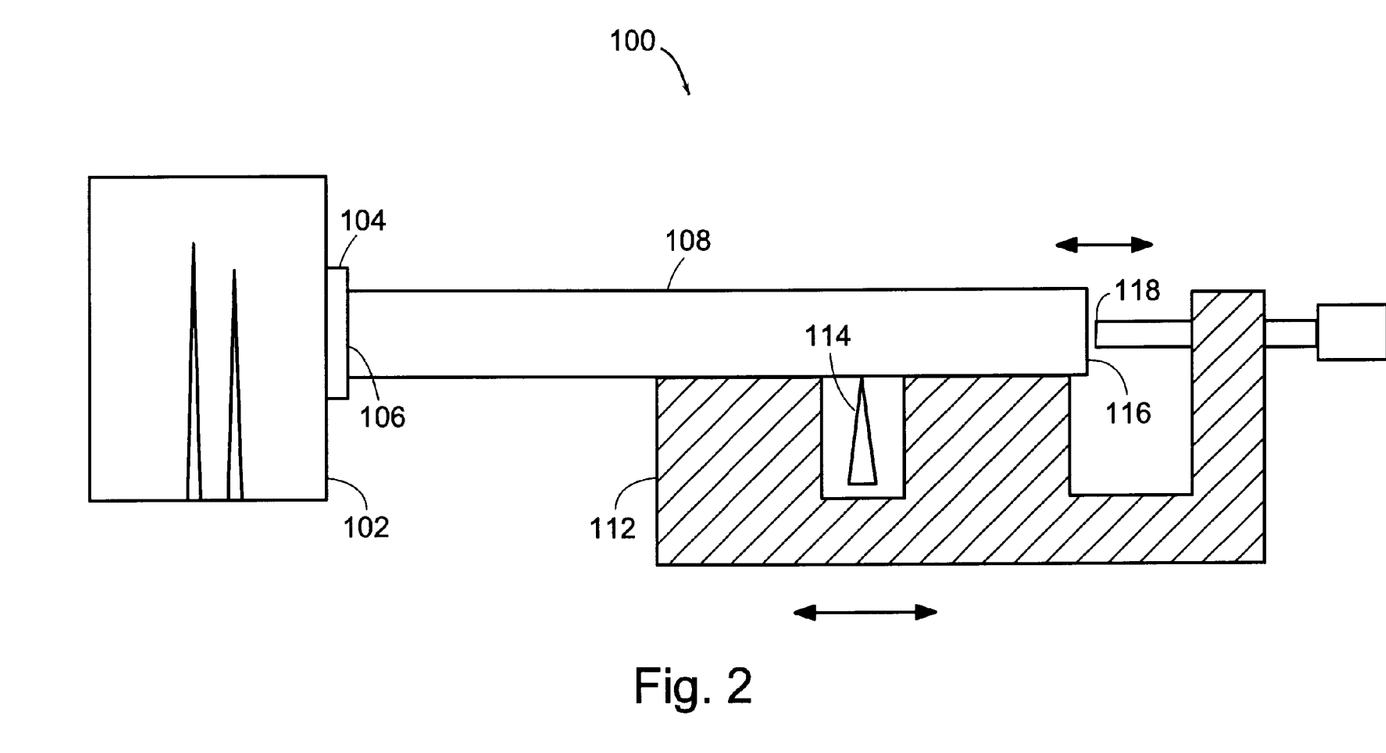
FIG. 2 illustrates a schematic diagram of a precision optical fiber cleaving apparatus according to the present invention.

FIG. 2 illustrates a schematic diagram of a precision optical fiber cleaving apparatus 100 according to the present invention. The cleaving apparatus 100 includes a precision reflectometer 102, such as the reflectometer described in connection with FIG. 1. The precision reflectometer 102 can be any type of reflectometer and there are several commercially available reflectometers. The reflectometer 102 includes a device under test port 104 that accepts a first end 106 of an optical fiber 108.

An optical fiber cleaving device 112 having an optical fiber cleaving tool 114 is positioned to receive the optical fiber 108. Any optical fiber cleaving device can be used and numerous optical fiber cleaving devices are sold commercially. The optical fiber cleaving device 112 positions the second end 116 of the optical fiber 108 so that light transmitting out of a second end 116 is unobstructed by the optical fiber cleaving device 112. The optical fiber cleaving device 112 includes a mechanism to secure the optical fiber 108 so that the fiber does not move during measurements and between measurement and cleaving.

A reference mirror 118 is positioned adjacent to the second end 116 of the optical fiber 108 in the path of optical radiation propagating from the second end 116. At least one of the optical fiber 108 and the reference mirror 118 are movable, so that the distance between the second end 116 of the optical fiber 108 and the reference mirror 118 can be changed. In one embodiment, at least one of the optical fiber 108 and the reference mirror 118 are mounted on a precision translation stage so that the distance between the second end 116 of the optical fiber 108 and the reference mirror 118 can be precisely controlled.

The reference mirror 118 is also movable relative to the optical fiber cleaving tool 114. In one embodiment, at least one of the reference mirror 118 and the optical fiber cleaving tool 114 are mounted on a precision translation stage so that the distance between the second end 116 of the optical fiber 108 and the reference mirror 118 can be precisely controlled.

Figure 3:
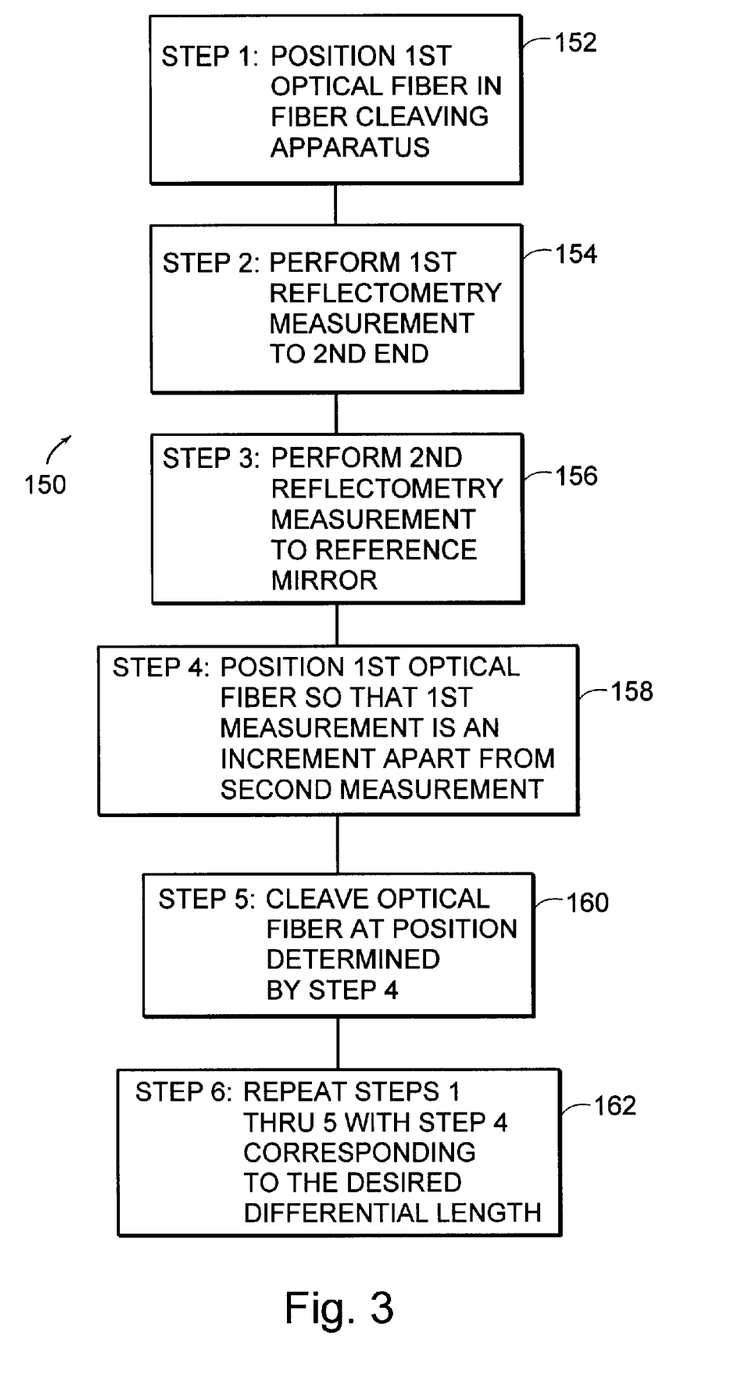
FIG. 3 illustrates a flow chart of a method of cleaving optical fibers to a precise length according to the present invention.

FIG. 3 is a flow chart of a method 150 of cleaving two or more optical fibers to a precise differential length according to the present invention. The method 150 is described with reference to the precision optical fiber cleaving apparatus 100 of FIG. 2. However, any optical fiber cleaving apparatus according to the present invention can be used to perform the method.

The first step 152 of the method of FIG. 3 is to position the first optical fiber in the precision optical fiber cleaving apparatus 100. A first end 106 of the first optical fiber 108 is positioned in the input port or the device under test (DUT) port 104 of the reflectometer. The second end 116 of the optical fiber 108 is positioned adjacent to the reference mirror 118 that is attached to the optical fiber cleaving device 112. The optical fiber cleaving tool 114 is positioned proximate to the first optical fiber and at a distance relative to a reference mirror 118.

The second step 154 of the method of FIG. 3 is to perform a first reflectometry measurement of the first optical fiber to the second end 116. The second end reflectometry measurement is displayed and/or stored on the precision reflectometer instrument display.

The third step 156 of the method of FIG. 3 is to perform a second reflectometry measurement of the first optical fiber to the reference mirror 118. The reference mirror 118 reflectometry measurement is displayed and/or stored on the precision reflectometer 102 instrument display.

The fourth step 158 of the method of FIG. 3 is to position the first optical fiber relative to the reference mirror 118 and the optical fiber cleaving tool 114 so that the first reflectometery measurement is a measurement increment apart from the second reflectometry measurement. The measurement increment can be a distance or a time increment. The measurement increment corresponds to an optical path length or a time difference between an optical signal propagating in the optical fiber 108 and reflecting from the second end 116 and an optical signal propagating in the optical fiber 108 and reflecting from the reference mirror 118.

The fifth step 160 is to cleave the optical fiber with the optical fiber cleaving tool 114 at the distance relative to a reference mirror 118. The cleaved optical fiber is then removed from the precision optical fiber cleaving apparatus 100. Other optical fibers can be cleaved to a precise differential length relative to the first optical fiber.

The sixth step 162 is to repeat step one through step five for a second optical fiber with the measurement increment in step four 158 being the same measurement increment displaced by a second measurement increment corresponding to a desired differential length between the first optical fiber and the second optical fiber. By desired differential length, we mean the desired difference in length between the first optical fiber and the second optical fiber.

For example, if it is desired to have the second optical fiber be substantially the same length as the first optical fiber, the desired differential length is zero and the sixth step 162 comprises repeating step one through step five for a second optical fiber with the measurement increment in step four 158 being the same measurement increment plus or minus a measurement increment corresponding to the initial length difference.

However, if it is desirable to have the length of the second optical fiber be 5 mm longer than the first optical fiber, the sixth step 162 comprises repeating steps one through step five for a second optical fiber with the measurement increment in step four 158 being the same measurement increment displaced by a measurement increment corresponding to 5 mm plus or minus a measurement increment corresponding to the initial length difference.

Optical fibers have been cut using the method of FIG. 3 to differential length accuracy of 20 microns or less. In comparison to prior art techniques for cutting optical fiber to precise differential lengths, the method of FIG. 3 is relatively easy to perform and takes a relatively short amount of time. The method of FIG. 3, therefore, can be used to improve the manufacturability of components for high-speed OTDM communication systems including multiplexers and demultiplexers. The method of FIG. 3 can also be used to improve the manufacturability of components for differential detection systems including coherent detection systems.

The present invention teaches taking two OTDR measurements and cleaving the optical fiber at a position relative to a reference mirror used for at least one of the OTDR measurements. Persons skilled in the art will appreciate the method of cleaving two or more optical fibers to a precise differential length according to the present invention has numerous variations. In one embodiment, one OTDR measurement is taken to the end of the optical fiber of another OTDR measurement is taken to a reference mirror that is positioned a known distance from the optical fiber cleaving tool and in the path of light propagating from the end of the optical fiber.

One application requiring precise differential lengths of optical fiber is optical time division multiplexing (OTDM) communication systems. OTDM communication systems include transmitters having all-optical multiplexers that require precise differential lengths of optical fibers for bit interleaving.

Figure 4:
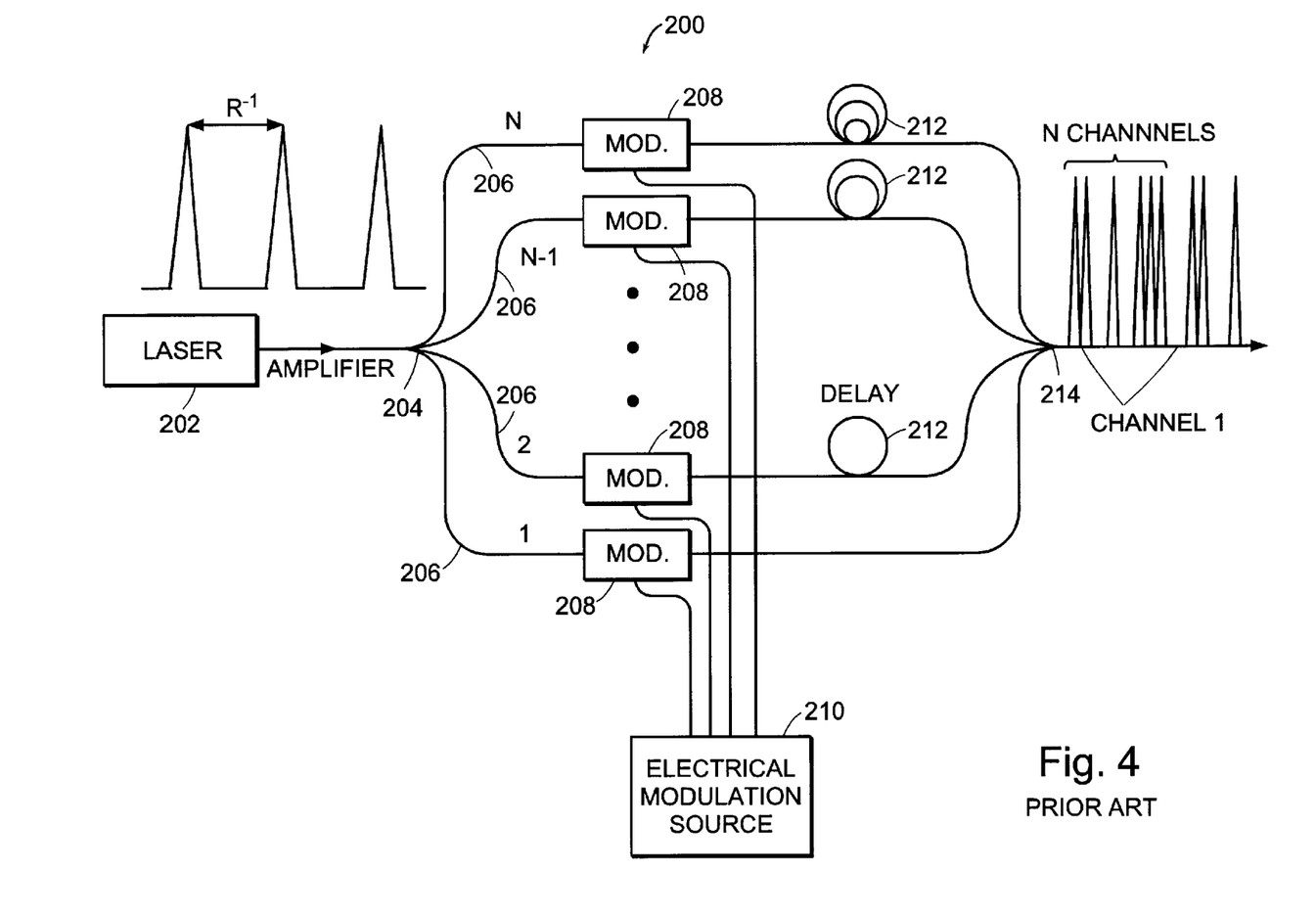
FIG. 4 illustrates a schematic diagram of a bit interleaved optical time division multiplexing transmitter that uses all-optical multiplexing to multiplex N channels with synchronized electrical modulation signals into a high-speed bit interleaved data channel.

FIG. 4 illustrates a schematic diagram of a bit interleaved OTDM transmitter 200 that uses all-optical multiplexing to multiplex N channels with synchronized electrical modulation signals into a high-speed channel. A laser 202 generates an optical clock signal that comprises a periodic pulse train having a repetition rate equal to a single-channel bit rate R and a having pulse width $T_p$, where $T_p$ is less than $(NR)^{-1}$ to ensure that each pulse can be positioned in its allocated time slot. An optical splitter 204, such as a 1×N fused fiber coupler, splits the laser output equally into N channels or arms 206 and directs each of the arms 206 to an electro-optic modulator 208.

The electro-optic modulator 208 in each arm 206 is modulated by a synchronized electrical modulation signal that is generated by an electrical modulation source 210. That is, the modulators 208 are modulated by electrical modulation signals that are substantially synchronized with each other. By substantially synchronized, we mean that the electrical modulation signals have substantially the same relative phase as the optical signal. In operation, each of the modulators 208 blocks the pulse for every "0" bit and passes the pulse for every "1" bit, thereby creating N independent bit streams propagating at the bit rate R.

Multiplexing of N bit streams is achieved by using different optical delays in each of the arms. An optical delay 212 is inserted into each arm 206 after the modulator 208. Each of the optical delays 212 has a predetermined precision optical time delay that is different from each of the other predetermined precision optical time delays. One arm may not have an optical delay other than an optical delay associated with the optical waveguide that couples the modulator to an output of the OTDM transmitter 200. The optical delays 212 delay the modulated bit stream in the $n^{th}$ arm by an amount equal to $(n-1)/(RN)$. An optical combiner 214 recombines the output of the N arms 206 to form a bit interleaved optical bit stream. The bit interleaved optical bit stream is a multiplexed bit stream where each bit is positioned in a time slot $T_R=(NR)^{-1}$.

One type of prior art OTDM multiplexer is fabricated with single-mode optical fiber and a lithium niobate or semiconductor waveguide modulator. The lengths of the single-mode optical fiber in each of the arms 206 must be precisely controlled in order to achieve the correct relative time delays in each arm 206. For example, a 40 GB/sec OTDM transmitter has a bit interleaved pulse-pulse spacing of 25 ps +/− approximately 0.5 ps. To achieve this pulse-to-pulse spacing, the fiber lengths in the four channels must have a differential length of 5 mm±0.1 mm. There are no prior art manufacturing techniques of repeatably cleaving optical fibers to a differential length that is within this tolerance.

It has been proposed that OTDM multiplexers be fabricated with planar lightwave circuits fabricated with silica-on-silicon technology. Such a multiplexer is advantageous because the optical delays can be precisely controlled. However, in G.P. Agrawal, *Fiber-Optic Communication Systems*, Wiley, 1997, pp. 330–331, it is noted that it is difficult to build the entire multiplexer on a planar lightwave circuit, since modulators cannot be integrated with this technology.

Figure 5:
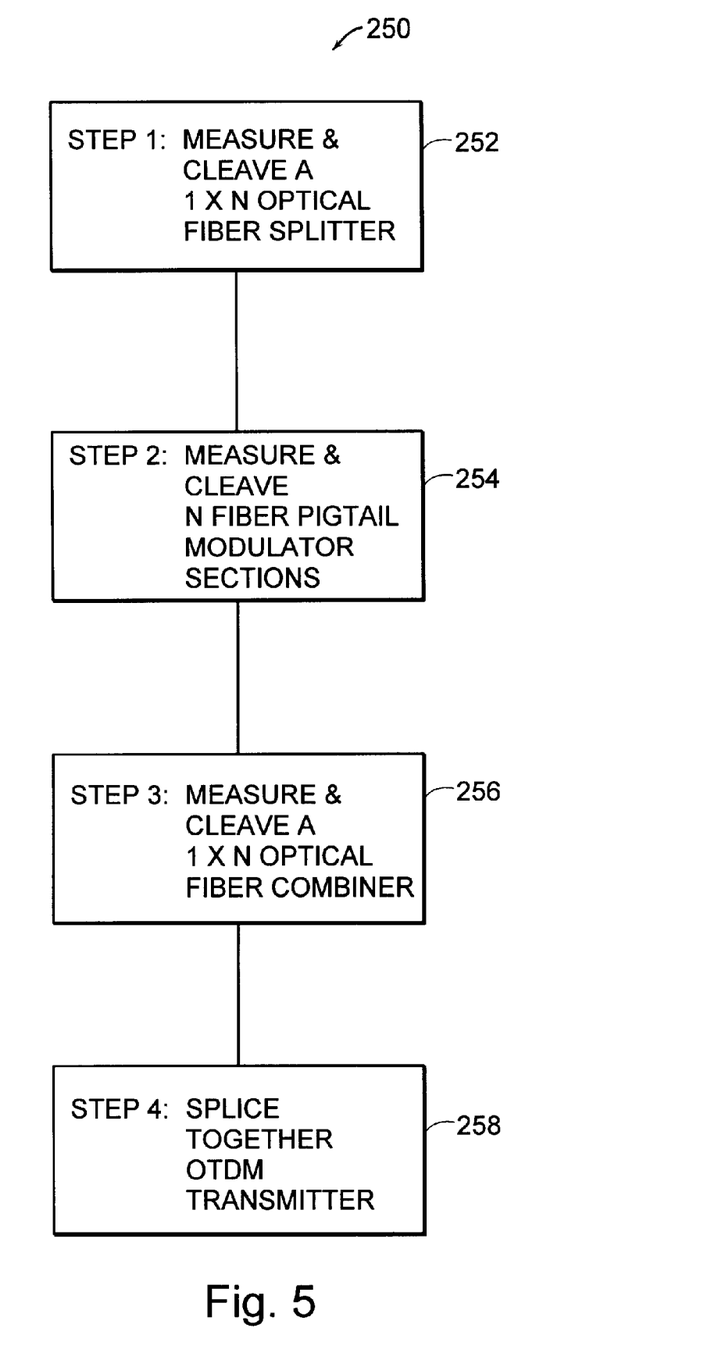
FIG. 5 illustrates a flow chart of a method of manufacturing a bit interleaved OTDM transmitter according to the present invention.

The method of cleaving optical fibers to precise differential lengths of the present invention can be used to manufacture the bit interleaved OTDM transmitter 200 of FIG. 4 and a similar OTDM receiver (not shown). FIG. 5 illustrates a flow chart of a method 250 of manufacturing a bit interleaved OTDM transmitter according to the present invention.

The first step 252 is to measure and cleave a 1×N optical fiber splitter 204 (FIG. 4) having an input optical fiber and N output optical fibers according the method of the present invention. In one embodiment, the N output optical fibers of the splitter 204 are measured and cleaved to substantially the same length.

The second step 254 is to measure and cleave N fiber pigtailed modulator sections to desired differential lengths according to the present invention. Referring to FIG. 4, each of the N fiber pigtailed modulator sections includes an arm 206, an electro-optic modulator 208, and an optical delay 212. In one embodiment, each of the arms 206 are measured and cleaved to substantially the same length and the optical delays 212 are measured and cleaved to lengths corresponding to the desired differential delays in each of the channels.

The third step 256 is to measure and cleave a 1×N optical fiber combiner 214 having N input optical fibers and an output optical fiber according the method of the present invention. In one embodiment, the N input optical fibers of the combiner 214 are measured and cleaved to substantially the same length.

The fourth step 258 is to splice together the OTDM transmitter. The N fiber pigtailed modulator sections are spliced to the 1×N optical fiber splitter 204 and to the 1×N optical fiber combiner 214. A respective one of the N output optical fibers of the 1×N optical fiber splitter 204 are spliced to a respective input of one of the N fiber pigtailed modulator sections cleaved to the desired differential length. An output of a respective one of the N fiber pigtailed modulator sections is spliced to a respective one of the inputs of the 1×N optical fiber combiner 214.

Although splicing the fiber pigtailed modulator sections to the 1×N optical fiber splitter 204 and the 1×N optical fiber combiner 214 changes the length by a small amount, the length changed by each splice is substantially the same length change in each of the channels. That is, the splices add a uniform common mode length change to each of the channels and, therefore, the splices have substantially no effect on the position of the interleaved bits.

In one embodiment, the OTDM transmitter 200 is a four-channel 40 Gb transmitter. In this embodiment, the desired differential lengths of the N fiber pigtailed modulator sections correspond to a difference in propagation time of approximately twenty-five picoseconds.

In one embodiment, each of the N output optical fibers of the 1×N optical fiber splitter 204, each of the arms 206, and each of the N input optical fibers of the 1×N optical combiner 214 have substantially the same length and the desired differential time delay in each of the channels is achieved with the different optical delays 212. However, the desired optical delays in each of the channels can be achieved anywhere in the optical path. In other embodiments, the desired optical delays are achieved in the output optical fibers of the 1×N optical fiber splitter 204, the N arms 206, and the input optical fibers of the 1×N optical combiner 214.

Another application that requires two or more optical fibers of precise differential length is differential detection. Differential detection is used in some communications and measurement systems, such as coherent optical communication systems. Coherent detection has some advantages in optical communication systems. For example, coherent detection has higher sensitivity compared with intensity modulation direct detection.

In differential detection systems, the received signal is mixed with a local oscillator optical signal that is typically generated by a narrow-linewidth laser. The resulting signal is detected with a homodyne or heterodyne receiver. One technique of constructing a differential detection system is to use two optical fibers having substantially the same length. The methods and apparatus of the present invention can be used to measure and cleave the two optical fibers for these differential detection systems.

Equivalents

While the invention has been particularly shown and described with reference to specific preferred embodiments, it should be understood by those skilled in the art that various changes in form and detail may be made therein without departing from the spirit and scope of the invention as defined by the appended claims. For example, although the method and apparatus of the present invention are described in connection with cleaving optical fiber to a precise length, the method and apparatus of the present invention can be used in connection with any waveguide.

What is claimed is:

1. A method of manufacturing a bit interleaved optical multiplexer having N channels, the method comprising:
   a) cleaving each of a plurality of N output optical fibers of a 1×N optical splitter to a desired differential length by aligning a fiber cleaving tool at a position that is determined with reference to two OTDR measurements of one of the plurality of N output optical fibers of the 1×N optical splitter;
   b) cleaving each of a plurality of N fiber pigtail modulator sections to a desired differential length by aligning a fiber cleaving tool at a position that is determined with reference to two OTDR measurements of one of the plurality of N fiber pigtail modulator sections; and
   c) cleaving each of a plurality of N input optical fibers of a 1×N optical combiner to a desired differential length by aligning a fiber cleaving tool at a position that is determined with reference to two OTDR measurements of one of the plurality of N input optical fibers of the 1×N optical combiner, wherein a respective one of the N channels of the bit interleaved optical multiplexer has a desired optical length comprising the desired differential length of a respective one of the plurality of N output optical fibers of the 1×N optical splitter, the desired differential length of a respective one of the plurality of N fiber pigtail modulator sections, and the desired differential length of a respective one of the plurality of N input optical fibers of the 1×N optical combiner.

2. The method of claim 1 wherein the two OTDR measurements of the one of the plurality of N output optical fibers of the 1×N optical splitter comprise a first OTDR measurement to an end of the one of the plurality of N output optical fibers of the 1×N optical splitter and a second OTDR measurement to a reference mirror.

3. The method of claim 1 wherein the two OTDR measurements of the one of the plurality of N input optical fibers of the 1×N optical combiner comprise a first OTDR measurement to an end of the one of the plurality of N input optical fibers of the 1×N optical combiner and a second OTDR measurement to a reference mirror.

4. The method of claim 1 wherein the two OTDR measurements of the one of the plurality of N fiber pigtail modulator sections comprise a first OTDR measurement to an end of the one of the plurality of N fiber pigtail modulator sections and a second OTDR measurement to a reference mirror.

5. The method of claim 1 wherein the desired differential lengths of at least two of the plurality of N input optical fibers of the 1×N optical combiner are substantially zero.

6. The method of claim 1 wherein the desired differential lengths of at least two of the plurality of N output optical fibers of the 1×N optical splitter are substantially zero.

7. The method of claim 1 wherein the desired differential length of at least one of the plurality of N fiber pigtail modulator sections corresponds to a desired time delay.

8. The method of claim 1 further comprising cleaving another one of the plurality of N output optical fibers to a desired differential length by aligning the fiber cleaving tool at a position that is determined with reference to the two OTDR measurements of the one of the plurality of N output optical fibers of the 1×N optical splitter and with reference to a measurement increment that corresponds to the desired differential length of the another one of the plurality of N output optical fibers of the 1×N optical splitter.

9. The method of claim 1 further comprising cleaving another one of the plurality of N fiber pigtail modulator sections to a desired differential length by aligning the fiber cleaving tool at a position that is determined with reference to the two OTDR measurements of the one of the plurality of N fiber pigtail modulator sections and with reference to a measurement increment that corresponds to the desired differential length of the another one of the plurality of N fiber pigtail modulator sections.

10. The method of claim 1 further comprising cleaving another one of the plurality of N input optical fibers to a desired differential length by aligning the fiber cleaving tool at a position that is determined with reference to the two OTDR measurements of the one of the plurality of N input optical fibers of the 1×N optical combiner and with reference to a measurement increment that corresponds to the desired differential length of the another one of the plurality of N input optical fibers of the 1×N optical combiner.

11. A bit interleaved optical multiplexer having N channels, the bit interleaved optical multiplexer comprising:
    a) a 1×N optical splitter comprising a plurality of N output optical fibers, each of the plurality of N output optical fibers being cleaved to a desired differential length by aligning a fiber cleaving tool at a position that is determined with reference to two OTDR measurements of one of the plurality of N output optical fibers of the 1×N optical splitter;

b) a plurality of N fiber pigtail modulator sections, each of the plurality of N fiber pigtail modulator sections being in optical communication with a respective one of the plurality of N output optical fibers and being cleaved to a desired differential length by aligning a fiber cleaving tool at a position that is determined with reference to two OTDR measurements of one of the plurality of N fiber pigtail modulator sections; and c) a 1×N optical combiner comprising a plurality of N input optical fibers, each of the plurality of N input optical fibers being in optical communication with a respective one of the plurality of N fiber pigtail sections and being cleaved to a desired differential length by aligning a fiber cleaving tool at a position that is determined with reference to two OTDR measurements of one of the plurality of N input optical fibers of the 1×N optical combiner, wherein a respective one of the N channels of the bit interleaved optical multiplexer has a desired optical length comprising the desired differential length of a respective one of the plurality of N output optical fibers of the 1×N optical splitter, the desired differential length of a respective one of the plurality of N fiber pigtail modulator sections, and the desired differential length of a respective one of the plurality of N input optical fibers of the 1×N optical combiner.

12. The bit interleaved optical multiplexer of claim 11 wherein the two OTDR measurements of the one of the plurality of N output optical fibers of the 1×N optical combiner comprise a first OTDR measurement to an end of the one of the plurality of N output optical fibers of the 1×N optical splitter and a second OTDR measurement to a reference mirror.

13. The bit interleaved optical multiplexer of claim 11 wherein the two OTDR measurements of the one of the plurality of N input optical fibers of the 1×N optical combiner comprise a first OTDR measurement to an end of the one of the plurality of N input optical fibers of the 1×N optical combiner and a second OTDR measurement to a reference mirror.

14. The bit interleaved optical multiplexer of claim 11 wherein the two OTDR measurements of the one of the plurality of N fiber pigtail modulator sections comprise a first OTDR measurement to an end of the one of the plurality of N fiber pigtail modulator sections and a second OTDR measurement to a reference mirror.

15. The bit interleaved optical multiplexer of claim 11 wherein the desired differential lengths of at least two of the plurality of N input optical fibers of the 1×N optical combiner are substantially zero.

16. The bit interleaved optical multiplexer of claim 11 wherein the desired differential lengths of at least two of the plurality of N output optical fibers of the 1×N optical splitter are substantially zero.

17. The bit interleaved optical multiplexer of claim 11 wherein the desired differential length of at least one of the plurality of N fiber pigtail modulator sections corresponds to a desired time delay.

18. The bit interleaved optical multiplexer of claim 11 wherein the 1×N optical splitter further comprises another one of the N output optical fibers that is cleaved to a desired differential length by aligning the fiber cleaving tool at a position that is determined with reference to the two OTDR measurements of the one of the plurality of N output optical fibers of the 1×N optical splitter and with reference to a measurement increment that corresponds to a desired differential length of the another one of the plurality of N output optical fibers of the 1×N optical splitter.

19. The bit interleaved optical multiplexer of claim 11 wherein the plurality of N fiber pigtail modulator sections further comprises another one of the plurality of N fiber pigtail modulator sections that is cleaved to a desired differential length by aligning the fiber cleaving tool at a position that is determined with reference to the two OTDR measurements of the one of the plurality of N fiber pigtail modulator sections and with reference to a measurement increment that corresponds to the desired differential length of the another one of the plurality of N fiber pigtail modulator sections.

20. The bit interleaved optical multiplexer of claim 11 wherein the 1×N optical combiner further comprises another one of the N input optical fibers that is cleaved to a desired differential length by aligning the fiber cleaving tool at a position that is determined with reference to the two OTDR measurements of the one of the plurality of N input optical fibers of the 1×N optical combiner and with reference to a measurement increment that corresponds to the desired differential length of the another one of the plurality of N input optical fibers of the 1×N optical combiner.

21. The bit interleaved optical multiplexer of claim 11 wherein the optical multiplexer comprises an OTDM transmitter for multiplexing N channels.

* * * * *